(12) United States Patent
Johnson et al.

(10) Patent No.: US 11,595,754 B1
(45) Date of Patent: Feb. 28, 2023

(54) PERSONALIZED HEADPHONE EQ BASED ON HEADPHONE PROPERTIES AND USER GEOMETRY

(71) Applicant: Apple Inc., Cupertino, CA (US)

(72) Inventors: Martin E. Johnson, Los Gatos, CA (US); Darius A. Satongar, Santa Clara, CA (US); Antti J. Vanne, Los Gatos, CA (US); Tomi A. Huttunen, Kuopio (FI)

(73) Assignee: APPLE INC., Cupertino, CA (US)

( * ) Notice: Subject to any disclaimer, the term of this patent is extended or adjusted under 35 U.S.C. 154(b) by 253 days.

(21) Appl. No.: 16/852,203

(22) Filed: Apr. 17, 2020

Related U.S. Application Data

(60) Provisional application No. 62/854,900, filed on May 30, 2019.

(51) Int. Cl.
*H04R 25/00* (2006.01)
*H04R 1/28* (2006.01)
*G06F 30/10* (2020.01)
*G06F 30/20* (2020.01)

(52) U.S. Cl.
CPC ........... *H04R 1/2873* (2013.01); *G06F 30/10* (2020.01); *G06F 30/20* (2020.01)

(58) Field of Classification Search
CPC ... H04R 3/04; H04R 2460/05; H04R 2460/15
See application file for complete search history.

(56) References Cited

U.S. PATENT DOCUMENTS

| | | | | |
|---|---|---|---|---|
| 9,544,706 B1 * | 1/2017 | Hirst | ........................ | H04S 7/304 |
| 10,129,681 B2 * | 11/2018 | Riggs | ...................... | H04S 7/301 |
| 10,734,965 B1 * | 8/2020 | McPherson | ............. | G06F 3/165 |
| 10,839,545 B2 * | 11/2020 | Huttunen | ................... | G06T 7/60 |
| 2012/0219161 A1 * | 8/2012 | Amada | ..................... | H04R 3/04 381/74 |
| 2013/0216052 A1 * | 8/2013 | Bruss | .................... | H04R 29/002 381/59 |
| 2014/0010381 A1 * | 1/2014 | Doy | ........................ | H04R 29/00 381/59 |
| 2017/0272890 A1 * | 9/2017 | Oh | .......................... | H04S 7/304 |
| 2017/0332186 A1 * | 11/2017 | Riggs | ...................... | H04S 7/304 |
| 2017/0366903 A1 * | 12/2017 | Meyer | .................. | H04R 25/353 |
| 2021/0076150 A1 * | 3/2021 | Ithapu | .................... | H04R 1/406 |
| 2021/0227312 A1 * | 7/2021 | Pornrojnangkool | ........................ | H04R 29/001 |
| 2022/0038832 A1 * | 2/2022 | Khaleghimeybodi | ........................ | H04R 1/1016 |

FOREIGN PATENT DOCUMENTS

EP 2268063 A1 * 12/2010 ........... H04R 25/658

* cited by examiner

*Primary Examiner* — Ryan Robinson
(74) *Attorney, Agent, or Firm* — Womble Bond Dickinson (US) LLP

(57) ABSTRACT

Audio processing for a headworn device can include obtaining ear geometry of a user. A frequency response or transfer function can be determined, based on the ear geometry of the user and a model of the headworn device, where the frequency response or transfer function characterizes an effect of a path between a speaker of the headworn device and an ear canal entrance of the user on sound. An equalization filter profile can be generated based on the based on the frequency response or transfer function. The equalization filter profile can be applied to an audio signal, and the audio signal can be used to drive the speaker of the headworn device.

20 Claims, 6 Drawing Sheets

US 11,595,754 B1

PERSONALIZED HEADPHONE EQ BASED ON HEADPHONE PROPERTIES AND USER GEOMETRY

FIELD

One aspect of the disclosure herein relates to audio processing with personalized equalization filtering.

BACKGROUND

Equalization filters can be used to increase or attenuate levels of different frequencies in an audio signal. The audio signal can be used to drive speakers of a headworn speaker device. Headworn speaker devices, such as headphone set, can be worn over-ear, on-ear, or in-ear. Some headworn speaker devices are extra-aural, for example, 'smart' glasses with an attached speaker system (e.g., located on the temples or temple tips of the eyeglasses).

SUMMARY

In audio systems, accurate control of sound delivered to a listener's ear drum is desirable. This is the case for a range of audio applications, from music playback to the creation of 3D virtual audio. Sound is modified as it travels from its point of origin to the user's ear canal, including modification effects caused by the user's unique ear geometry. Thus, when a subject wears headworn speaker devices, sound traveling from the speaker to the entrance of the ear canal can be effected by the presence and geometry of the user's ear (e.g., the pinna and arrangement of pinna on user's head) and by geometry of the headworn speaker device.

Audio that already contains pinna cues (e.g., spatialized audio) can create a double-pinna effect when heard with an over-ear, on-ear, or extra—aural speaker device, because additional pinna cues of the listener are added when the sound travels from the speaker of the device to the user's ears. A tailored EQ filter profile can compensate for (e.g. remove or substantially reduce) the latter pinna cues, thereby improving control of the audio delivered to the user's ears.

In the case where audio does not contain pinna cues, but is delivered through an in-ear speaker device, the audio can sound unnatural because it is lacking pinna cues that the user is accustomed to. Thus, a tailored EQ filter profile can be used to spectrally shape the audio to add pinna cues of the listener's ears so that the audio experience feels natural.

A generic compensation equalizer (EQ) can be used to compensate for (e.g., remove or substantially reduce) the double pinna effect, or to add a pinna effect for a natural sound. A generic compensation EQ profile can be made by averaging the frequency responses across a large number of subjects but this only compensates for general trends (or an 'average' user) and, thus, a generic compensation EQ filter is not tailored to the individual's unique ear shape.

A generic compensation EQ approach can be ineffective, however, due to large variations between ear geometries that can lead to large variations between pinna cues of different users (see, e.g., FIG. 4). Calculating and compensating for a frequency response or transfer function that accounts for the geometry of the user and the geometry of a headworn device can improve control of sound at the listener's eardrum, remove unwanted pinna effects, and add pinna effect where desirable.

In one aspect, a method of processing audio for a headworn device includes: generating or obtaining an ear geometry of a user; determining a frequency response or transfer function characterizing an effect of a path between a speaker of the headworn device and an ear canal entrance of the user on sound, based on the ear geometry of the user and a model of the headworn device; generating an equalization filter profile based on the frequency response or transfer function; and applying the equalization filter profile to an audio signal, wherein the audio signal is used to drive the speaker of the headworn device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Process

Figure 1:
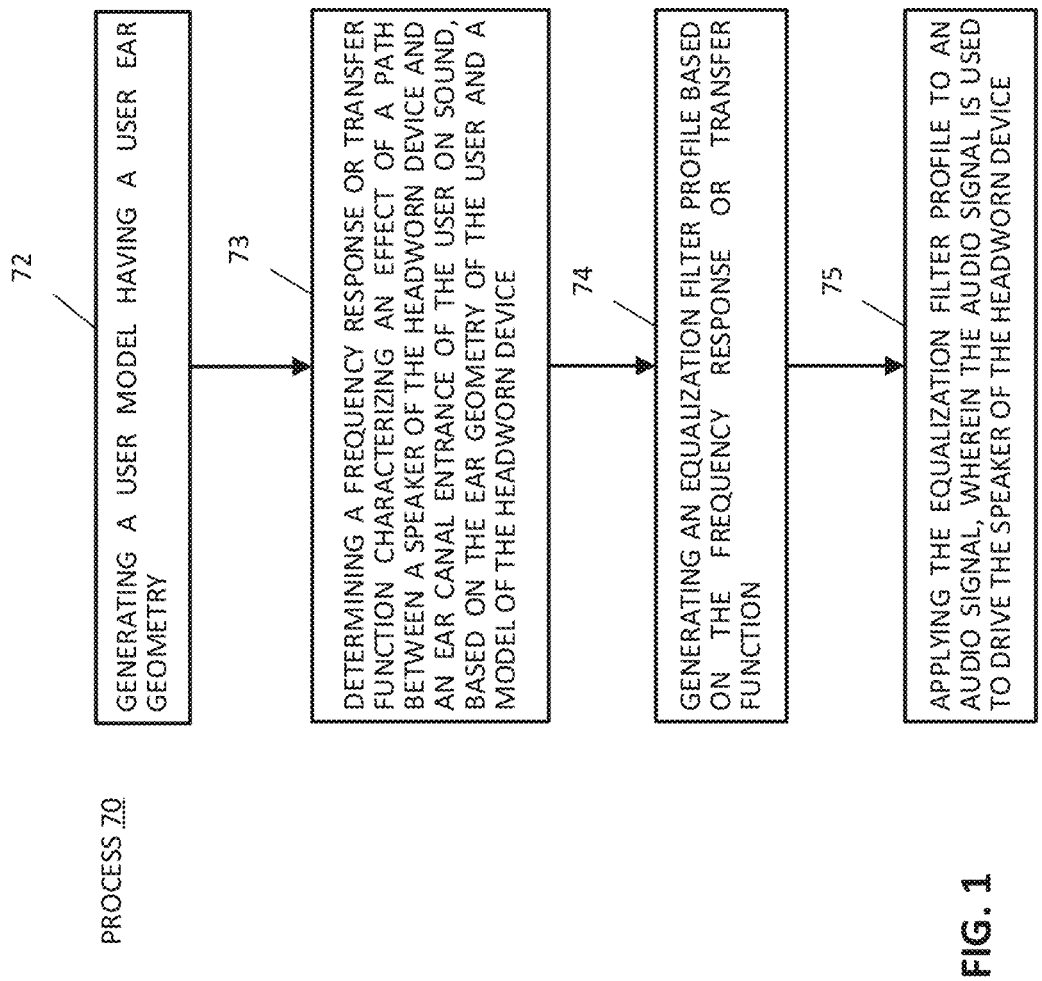
FIG. 1 illustrates a process, according to one aspect.

Referring now to FIG. 1, a process 70 is shown for processing audio with a customized EQ filter profile for a headworn device. The headworn device can be an extra-aural headphone set, over-ear headphone set, on-ear headphone set, in-ear headphone set, head mounted display, or other headworn device having a speaker. The process can be performed by a processor of an article of manufacture, the headworn device, and other computing devices.

At block 72, the process includes generating or obtaining an ear geometry model of a user. Obtained ear geometry can be generated by capturing one or more images of a user ear with a depth scanner, camera, magnetic resonance imaging (MRI), or combinations thereof.

Referring back to FIG. 1, at block 73, the process includes determining a frequency response or transfer function characterizing an effect of a path between a speaker of the headworn device and an ear canal entrance of the user on sound, based on the ear geometry of the user and a model of the headworn device. The model can be a three-dimensional computer aided design (CAD) model of the headworn device.

In one aspect, the model contains details indicating the characteristics of the speaker. For example, the model of the headworn device includes one or more of the following parameters of the speaker of the headworn device: a speaker location, a sound direction, a geometry, a sound pressure level (SPL) range, a distortion, or a frequency response characteristic. These characteristics can be used in a multi-physics simulation to determine the frequency response or transfer function of the sound path between the speaker and the listener's ear canal. For example, the multi-physics simulation can specify where the speaker is located, in what direction the sound will likely propagate from the speaker, the range of sound pressure levels of the speaker, a distortion of the speaker at different sound pressure levels, and frequency response characteristics of the speaker. The speaker can be an electro-acoustic transducer.

At block 74, the process can include generating an equalization filter profile based on the based on the frequency response or transfer function of the sound path between the speaker and the listener's ear canal. At block 75, the process can include applying the equalization filter profile to an audio signal, wherein the audio signal is used to drive the speaker of the headworn device.

An equalization filter profile can include or define a plurality of filter coefficients for different frequency bands of the audible spectrum range. The EQ filter can be implemented through or applied as digital filters with digital signal processing techniques. The profile shape (e.g., the different coefficients at different frequency bands) can be determined as a function (e.g., proportional to or the inverse of) of the frequency response or transfer function.

In one aspect, the headworn device is an over-ear, on-ear, or extra-aural headphone set. The equalization filter profile can be based on an inverse of the frequency response or transfer function, to compensate for (e.g. remove or substantially reduce) the effect of the path between the speaker of the headworn device and the ear canal entrance of the user on sound when applied to the audio signal. This can compensate for and remove the 'double pinna' effect caused by spatialized audio that already contains pinna cues specific to the directions of the intended, virtual sound source directions. The double pinna effect can happen when spatialized audio already containing pinna cues travels from the speaker of the headworn device to the user's ear and picks up additional pinna cues caused by the user's physical ear which are specific to the direction of the headworn device's transducer(s) and relative ear position. The tailored EQ filtering can remove the additional pinna cues, thereby granting greater control over the audio that is delivered to the user's ear canal.

In one aspect, process 70 is performed as part of a spatial audio process. Blocks 72-75 can be performed on an audio signal either prior-to, or after being rendered spatially by a head related transfer function (HRTF). This can compensate for double pinna effect of spatialized audio in a tailored manner.

In one aspect, the process 70 is performed for two audio signals, a left channel and a right channel. The EQ filter profile used on the left channel can be based on the left ear geometry of the user and the EQ filter profile used on the right channel is based on the right ear geometry of the user. The left and right audio channels can be used to drive a left and right speaker of a headworn device.

Figure 3:
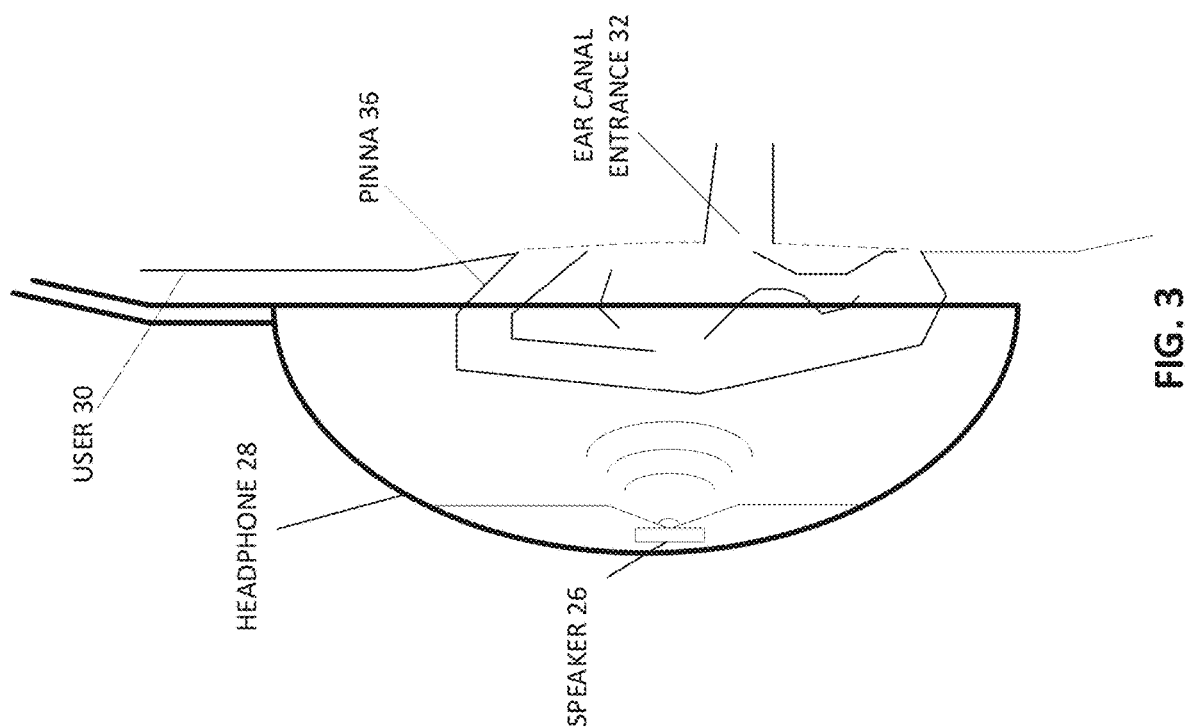
FIG. 3 illustrates an audio device, according to one aspect.

Referring now to FIG. 3, a user 30 is shown wearing an over-ear headphone set 28. The headset is shown having a speaker 26 that is driven by an audio signal to produce sound. If the audio signal already contains pinna cues (e.g., if it was rendered with a head related transfer function (HRTF)) then the pinna 36 can add additional pinna cues to the sound as the sound moves to the ear canal entrance 32. Thus, unless removed, the user would experience a 'double pinna' effect which could be acoustically confusing and provide a negative listening experience. As mentioned above, the tailored EQ filtering can remove the additional pinna cues caused by the user's pinna.

In one aspect, the headworn device is an in-ear headphone set (e.g. ear buds) and the equalization filter profile, when applied to the audio signal, adds the effect of the path between the speaker of the headworn device and the ear canal entrance of the user. In such a case, a sound that is delivered directly to the entrance of the user's ear canal by in-ear headphones can be spectrally shaped by the EQ filter to add pinna cues tailored to the user. This can provide a more natural acoustic experience.

Illustrated Process Flow

Figure 2:
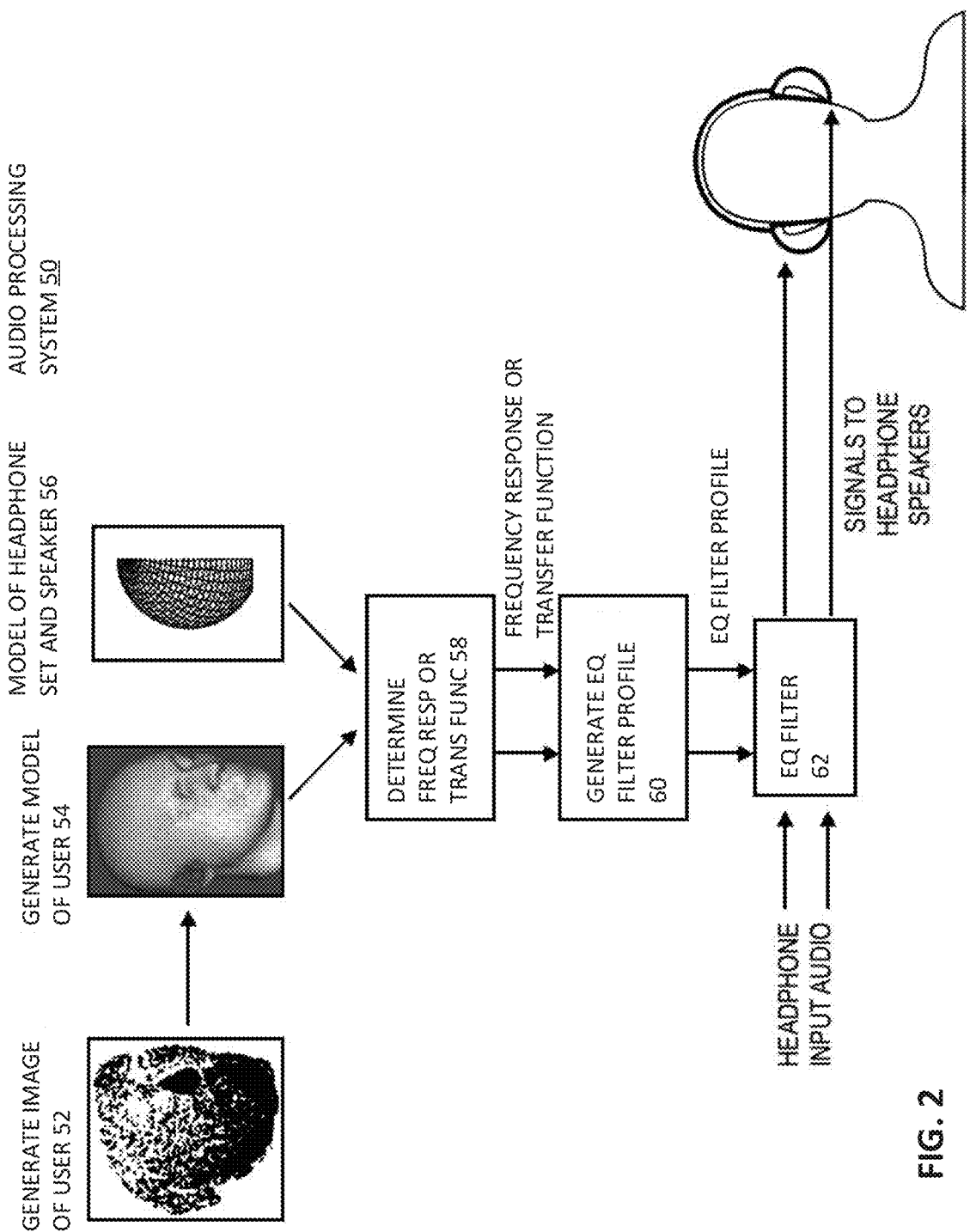
FIG. 2 illustrates an audio system and process, according to one aspect.

A flow diagram is shown in FIG. 2 to illustrate an audio processing system 50 that can perform the process described in FIG. 1 according to one embodiment. At block 52, an image of a user can be generated by an image capture device (e.g., a depth scanner, camera, magnetic resonance imaging (MRI), or combinations thereof). At block 54, a three dimensional user geometry model can be generated based on the captured image. The model can include the user's ear geometry (e.g., the pinna geometry, location of the ear canal) and head geometry. For example, image-based model and rendering (IBMR) methods can construct the model based on a set of images of the user. Other three dimensional modeling techniques can be used to construct the model based on the captured image.

A model of a headphone set (including speaker) can be generated or retrieved at block 56. The model can include three dimensional geometry of the headphone set, for example, dimensions, size and shape; and speaker properties of the speaker of the headphone set.

Based on the user geometry model and the headphone model, the system can, at block 58, determine a frequency response or transfer function characterizing an effect of a path between a speaker of the headworn device and an ear canal entrance of the user on sound. In one aspect, the ear geometry of the user (or the user geometry model) and the model of the headworn device is combined into a composite model. A numerical simulation is performed on the composite model. The numerical simulation can be performed with a) a finite element method, b) a boundary element method, or c) a multi-physics simulation, including characterization of the speaker of the headworn device. As discussed earlier, the characterization of the speaker can include a speaker location, a sound direction, a geometry, a sound pressure level (SPL) range, a distortion, or a frequency response characteristic of the speaker. The numerical simulation can provide the frequency response and/or the transfer function, accounting for the geometry of the user's ear and head (e.g., the pinna geometry and location of ear canal), geometry of the device, and the characteristics of the speaker.

In one aspect, the system can estimate a fit of the headworn device on the user based on the ear geometry of the user and the model of the headworn device. For example, based on the size and/or shape of the user's ear and the size and/or shape of the device, one or more fits can be determined or estimated. The simulation can be performed with the combined model having the headworn device arranged on the user based on the estimated fit. Being that small variations in location of the speaker of the headworn device relative to the entrance of the user's ear canal can have a substantial effect on the frequency response and transfer function, the fit estimation can provide a more accurate frequency response and transfer function, by predicting how the user will wear the headworn device and the relative location of the speaker to the ear canal.

Variations in Frequency Response over Multiple Subjects

Figure 4:
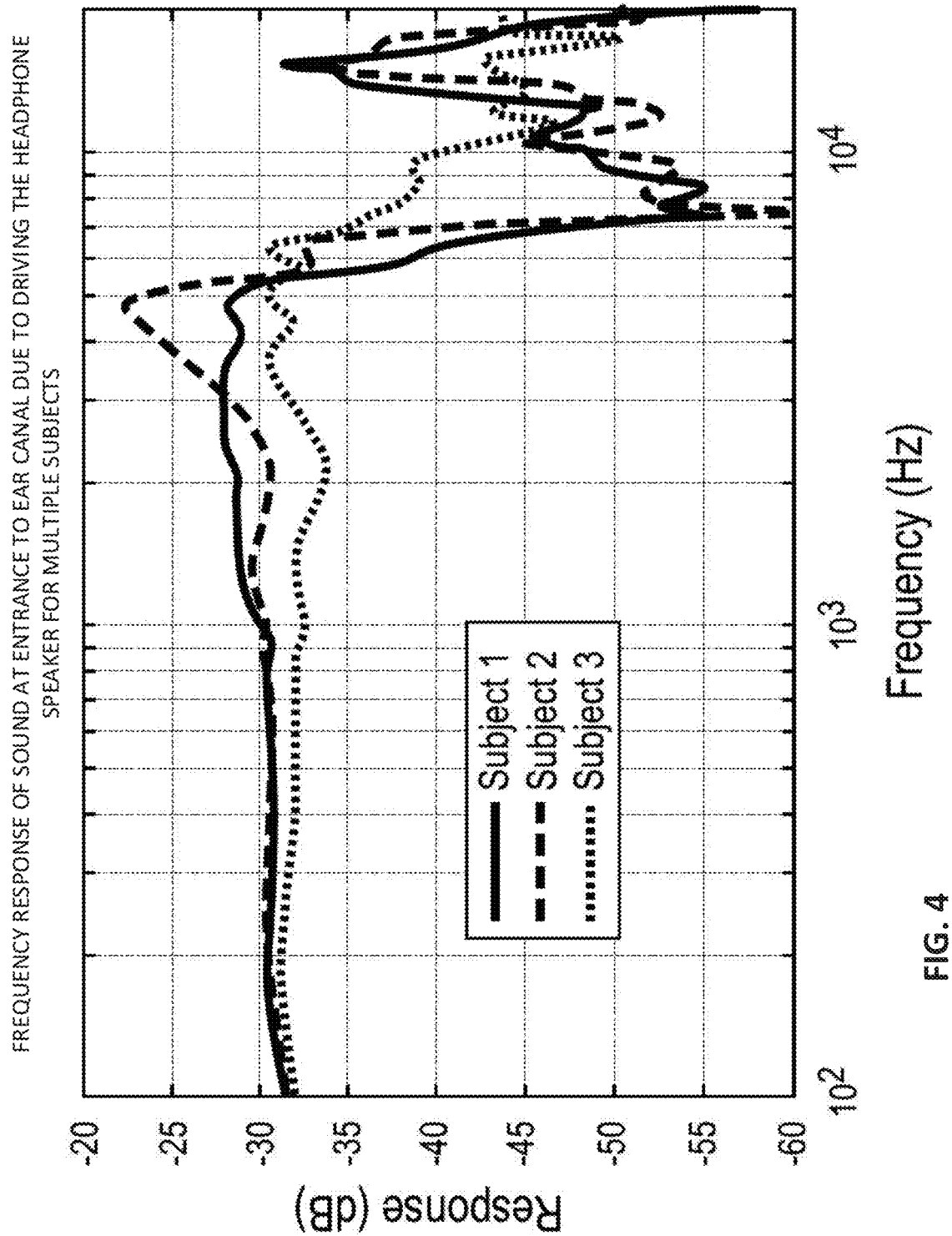
FIG. 4 illustrates frequency response of multiple users.

FIG. 4 shows the frequency response of sound at ear canal entrance of three different subjects—subject 1, subject 2, and subject 3, using the same headphone set. In this experiment, microphones were placed at the entrance of the ear canal of the three subjects. The difference in frequency response can be shown to increase at high frequencies. This difference can be attributed, at least in part, to anatomical differences between the subjects.

By removing such effects with customized EQ filtering, the playback of sound at each subject's ear canal entrance can be controlled better. In addition, each subject can potentially perceive the same audio experience, in a manner intended by the audio content provider.

Architectural Aspects

Figure 5:
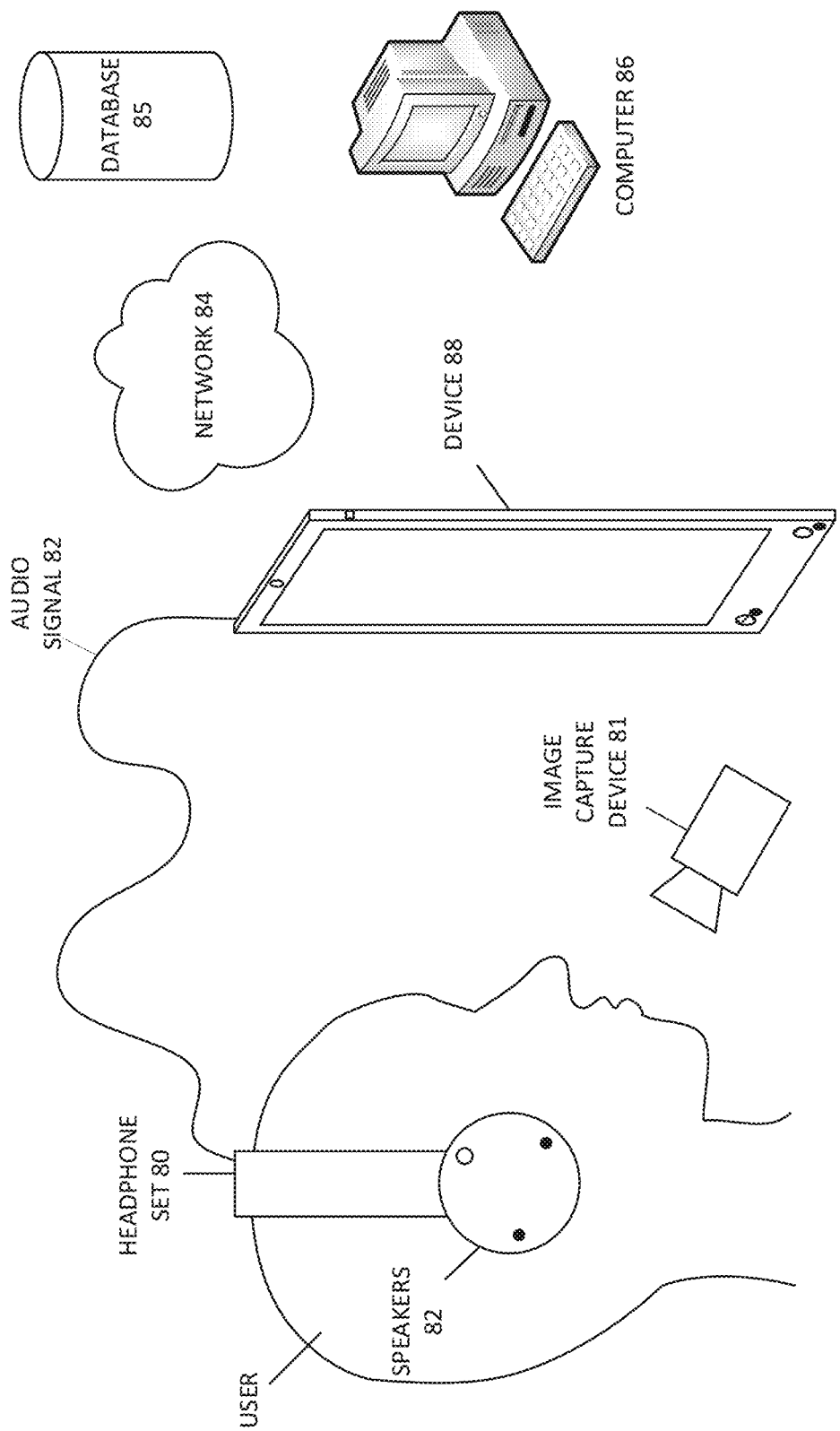
FIG. 5 illustrates audio system architecture, according different aspects.

In one aspect, the model of the user can be generated in a dedicated facility (e.g., a laboratory). In another aspect, the model of the user can be generated by the user with a camera and a dedicated application that converts images from the camera into a model with user geometry. Referring now to FIG. 5, in one aspect, the model of the headphone set and speaker characteristics and/or the model of the user can be stored in one or more databases 85 that can be accessible through a network 84.

In one aspect, blocks 72-75 of FIG. 1 can be performed by a computer 86 or mobile device 88 (e.g., a smart phone or tablet computer) or headphone set 80 and an image capture device 81, any of which can be connected to a network 84 and provide the audio signal 82 to the headphone set 80, which can drive speakers 82 with the audio signal 82 having therein the personal EQ filtered audio. The image capture device 81 can be integral to any of the computing devices or standalone.

In one aspect, the headphone set can have stored in local memory, the personalized EQ filter profile, and perform block 75 by applying the personized EQ filter profile to audio signal 82 prior to driving the audio signal. As discussed, the filtering can be applied through digital filters by digital signal processing techniques.

In another aspect, the headphone set (which can be any headworn device with speakers) can perform blocks 73 and/or 74 in addition to block 75. For example, the headphone set can receive a user model having ear geometry of a user through known communication technologies, and determine the frequency response or transfer function based on the user model and the headworn device model. In another example, the headphone set can receive the frequency response or transfer function through known communication technologies, and generate the customized EQ filter profile based on the frequency response or transfer function. Other architectures can be implemented.

In one aspect, a process performed by the systems described can include applying an equalization filter profile to an audio signal, wherein a) the equalization filter profile is generated based on a frequency or transfer function characterizing an effect of a path between a speaker of the headworn device and an ear canal entrance of the user on sound, and b) the frequency response or transfer function is determined based on the ear geometry of the user and a model of the headworn device.

Figure 6:
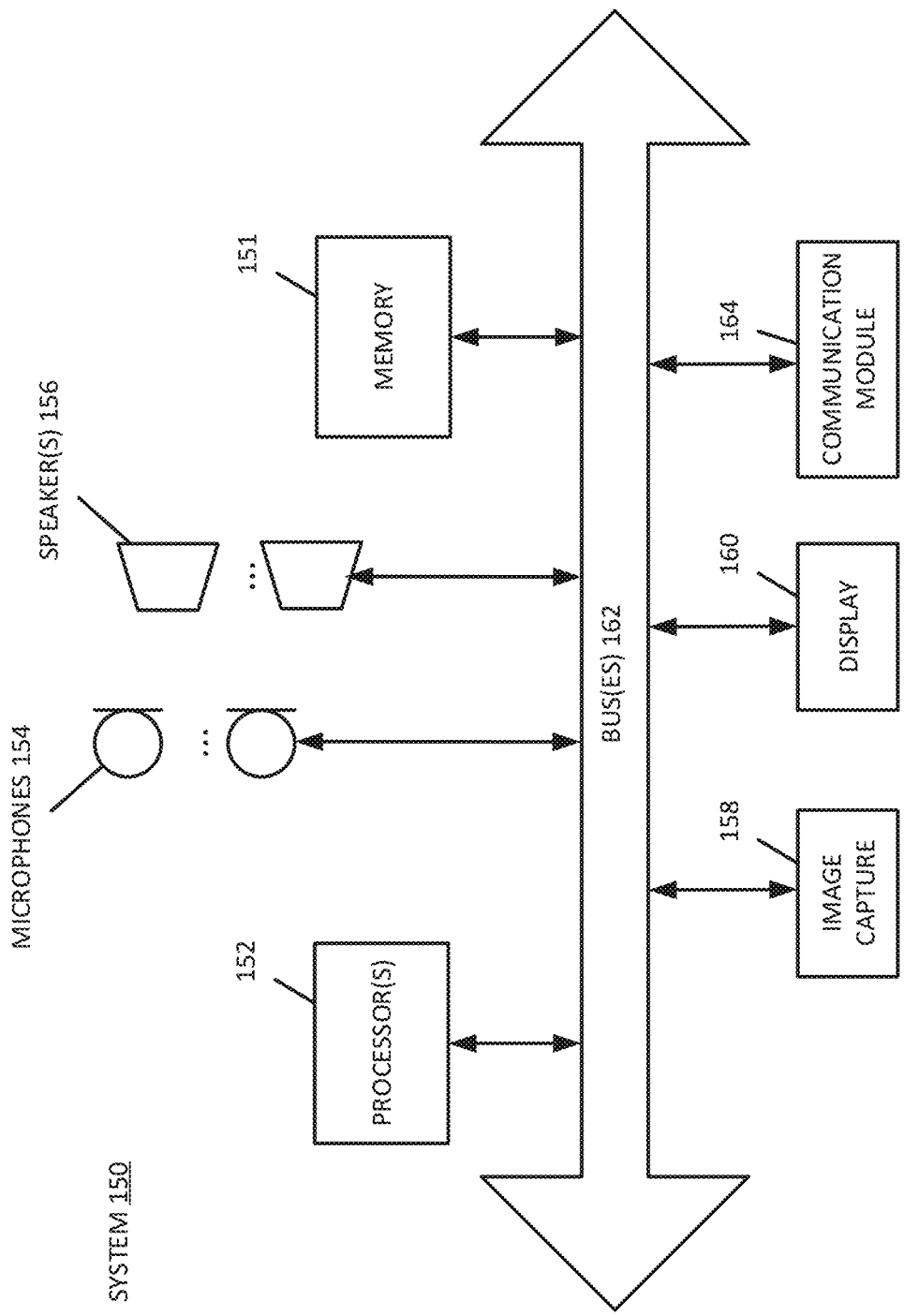
FIG. 6 illustrates an example of audio system hardware, according to one aspect.

FIG. 6 shows a block diagram of audio processing system hardware, in one aspect, which may be used with any of the aspects described herein. For example, the audio processing system can describe the headphone set, the image capture device, the database, and/or any computing devices shown in FIG. 5. This audio processing system can represent a general purpose computer system or a special purpose computer system. Note that while FIG. 6 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. Accordingly, the processes described herein are not limited to use with the hardware and software of FIG. 6.

As shown in FIG. 6, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art.

Memory, although not shown in FIG. 6, can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device. The system can include one or more image capture devices 158 and display 160.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "estimator", "combiner", "synthesizer", "controller", "localizer", "spatializer", "component," "unit," "module," and "logic", "extractor", "subtractor", "generator", "optimizer", "processor", and "simulator" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method of processing audio for a headworn device comprising:
    obtaining ear geometry of a user;
    determining a frequency response characterizing an effect of a path between a speaker of the headworn device and an ear canal entrance of the user on sound, based on the ear geometry of the user and a model of the headworn device;
    generating an equalization filter profile based on the frequency response; and
    applying the equalization filter profile to a spatialized audio signal, wherein the spatialized audio signal is used to drive the speaker of the headworn device and the equalization filter profile removes the effect of the path between the speaker of the headworn device and the ear canal entrance of the user.

2. The method of claim 1, wherein the ear geometry of the user is generated by capturing an image of a user ear with a depth scanner, camera, magnetic resonance imaging (MRI), or combinations thereof.

3. The method of claim 1, wherein the ear geometry of the user includes pinna geometry, and the equalization filter profile spectrally shapes the audio signal to add or remove pinna cues.

4. The method of claim 1, wherein the headworn device is an extra-aural headphone set, over-ear headphone set, on-ear headphone set, in-ear headphone set.

5. The method of claim 1, wherein the model of the headworn device includes a computer aided design (CAD) model of the headworn device.

6. The method of claim 5, wherein the model of the headworn device includes one or more of the following parameters of the speaker of the headworn device: a location, a sound direction, a geometry, a sound pressure level (SPL) range, a distortion, or a frequency response characteristic.

7. The method of claim 1, wherein determining the frequency response includes combining the ear geometry of the user and the model of the headworn device into a composite model and performing a numerical simulation on the composite model.

8. The method of claim 7, wherein the numerical simulation is performed with a) a finite element method, b) a boundary element method, or c) a multi-physics simulation, including characterization of the speaker of the headworn device.

9. The method of claim 1, wherein determining the frequency response includes estimating a fit of the headworn device on the user based on the ear geometry of the user and the model of the headworn device.

10. The method of claim 1, wherein the headworn device is an over-ear, on-ear, or extra-aural headphone set, and the equalization filter profile is based on an inverse of the frequency response, to compensate for the effect of the path between the speaker of the headworn device and the ear canal entrance of the user on sound when applied to the audio signal.

11. The method of claim 10, wherein the audio signal contains spatialized audio that includes pinna cues, and the equalization filter profile compensates for those pinna cues.

12. The method of claim 1, wherein the headworn device is an in-ear headphone set and the equalization filter profile, when applied to the audio signal, adds the effect of the path between the speaker of the headworn device and the ear canal entrance of the user.

13. A system for processing audio for a headworn device comprising:
a processor; and
non-transitory memory having stored therein a plurality of instructions, that when executed by the processor, perform the following:
generating ear geometry of a user;
determining a frequency response characterizing an effect of a path between a speaker of the headworn device and an ear canal entrance of the user on sound, based on the ear geometry of the user and a model of the headworn device;
generating an equalization filter profile based on the frequency response; and
applying the equalization filter profile to a spatialized audio signal, wherein the audio signal is used to drive the speaker of the headworn device and the equalization filter profile removes the effect of the path between the speaker of the headworn device and the ear canal entrance of the user.

14. The system of claim 13, wherein generating the ear geometry of the user includes capturing an image of a user ear with a depth scanner, camera, magnetic resonance imaging (MRI), or combinations thereof.

15. The system of claim 13, wherein the ear geometry of the user includes pinna geometry, and the equalization filter profile spectrally shapes the audio signal to add or remove pinna cues.

16. The system of claim 13, wherein the model of the headworn device includes a computer aided design (CAD) model of the headworn device.

17. The system of claim 13, wherein determining the frequency response includes combining the ear geometry of the user and the model of the headworn device into a composite model and performing a numerical simulation on the composite model.

18. The system of claim 13, wherein
the headworn device is an over-ear, on-ear, or extra-aural headphone set,
the audio signal the audio signal contains spatialized audio that includes pinna cues, and
the equalization filter profile is based on an inverse of the frequency response, to compensate for the effect of the path between the speaker of the headworn device and the ear canal entrance of the user on sound, including the pinna cues, when applied to the audio signal.

19. The system of claim 18, wherein the headworn device is an in-ear headphone set and the equalization filter profile, when applied to the audio signal, adds the effect of the path between the speaker of the headworn device and the ear canal entrance of the user, including pinna cues.

20. An article of manufacture, comprising:
a processor; and
non-transitory memory having stored therein a plurality of instructions, that when executed by the processor, perform the following:
obtaining ear geometry of a user;
determining a transfer function characterizing an effect of a path between a speaker of the headworn device and an ear canal entrance of the user on sound, based on the ear geometry of the user and a model of the headworn device;
generating an equalization filter profile based on the transfer function; and
applying the equalization filter profile to en-a spatialized audio signal, wherein the spatialized audio signal is used to drive the speaker of the headworn device and the equalization filter profile removes the effect of the path between the speaker of the headworn device and the ear canal entrance of the user.

* * * * *